(12) United States Patent
Bae et al.

(10) Patent No.: US 10,103,381 B2
(45) Date of Patent: Oct. 16, 2018

(54) TRAPPING DISSOLVED POLYSULFIDE FOR HIGH PERFORMANCE BATTERIES

(71) Applicant: PALO ALTO RESEARCH CENTER INCORPORATED, Palo Alto, CA (US)

(72) Inventors: Chang-Jun Bae, Mountain View, CA (US); Eric J. Shrader, Belmont, CA (US); Ranjeet Rao, Redwood City, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 396 days.

(21) Appl. No.: 14/511,910

(22) Filed: Oct. 10, 2014

(65) Prior Publication Data

US 2016/0104881 A1 Apr. 14, 2016

(51) Int. Cl.
| | | |
|---|---|---|
| *H01M 4/02* | (2006.01) | |
| *H01M 4/38* | (2006.01) | |
| *H01M 4/13* | (2010.01) | |
| *H01M 4/139* | (2010.01) | |
| *H01M 4/62* | (2006.01) | |
| *H01M 4/66* | (2006.01) | |
| *H01M 10/052* | (2010.01) | |

(52) U.S. Cl.
CPC ............ *H01M 4/38* (2013.01); *H01M 4/13* (2013.01); *H01M 4/139* (2013.01); *H01M 4/62* (2013.01); *H01M 4/663* (2013.01); *H01M 4/667* (2013.01); *H01M 10/052* (2013.01)

(58) Field of Classification Search
CPC ............ H01M 4/36; H01M 4/38; H01M 4/48; H01M 4/483; H01M 4/04; H01M 10/052; H01M 4/13; H01M 4/139; H01M 4/62; H01M 4/663; H01M 4/667
See application file for complete search history.

(56) References Cited

U.S. PATENT DOCUMENTS

| | | | |
|---|---|---|---|
| 6,210,831 B1 | 4/2001 | Gorkovenko et al. | |
| 2002/0009639 A1* | 1/2002 | Miyake | H01M 4/366 429/218.1 |
| 2015/0010788 A1* | 1/2015 | Aria | H01M 4/362 429/50 |

OTHER PUBLICATIONS

Zhang, et al., "A new direction for the performance improvement of rechargeable lithium/sulfur batteries," Journal of Power Sources 200 (2012), pp. 77-82.
Zhang, et al. "A proof-of-concept lithium/sulfur liquid battery with exceptionally high capacity density," Journal of Power Sources 211 (2012), pp. 169-172.
Evers, et al., "Understanding the Nature of Absorption/Adsorption in Nanoporous Polysulfide Sorbents for the Li—S Battery," Journal of Physical Chemistry (Aug. 9, 2012), pp. 19653-19658.

\* cited by examiner

*Primary Examiner* — Stephen J Yanchuk
(74) *Attorney, Agent, or Firm* — Miller Nash Graham & Dunn LLP

(57) ABSTRACT

An electrode having a first set of stripes of sulfur-containing materials forming electroactive regions and a second set of stripes of a material forming non-electroactive regions interdigitated with the first set of stripes.

5 Claims, 6 Drawing Sheets

TRAPPING DISSOLVED POLYSULFIDE FOR HIGH PERFORMANCE BATTERIES

RELATED APPLICATIONS

This application is related to U.S. patent application Ser. No. 13/727,960, filed Dec. 27, 2012, published as U.S. Publication No. 2014/0186700, and U.S. patent application Ser. No. 14/329,537, filed Jul. 11, 2014.

BACKGROUND

Lithium-sulfur batteries (Li/S) are considered one of the most promising candidates to replace conventional Lithium-ion (Li-ion) batteries. Li—S batteries perform better with significantly higher specific density, theoretically 2600 Wh/kg. Li-ion batteries have a theoretical 430 Wh/kg capacity, typically 120 Wh/kg practically. Additionally, Li—S batteries have an operating voltage of 2.1 V at the second lower voltage plateau, suitable for low voltage electronic devices. Economically, these batteries have significantly lower costs, as sulfur is much less expensive than the transitional metals used in current Li-ion batteries.

However, in practice, these batteries face serious problems of low active material utilization and poor rechargeability, due to the insulating nature of sulfur and solid reduction products, also referred to as the polysulfide redox shuffle. Further, there is a loss of active material in the form of insoluble polysulfide reaction products. Current research efforts have been mostly focused on the protection of the lithium anode from reactions with the polysulfide and suppression of the diffusion of dissolved polysulfide out of the cathode.

DETAILED DESCRIPTION OF THE EMBODIMENTS

Figure 1:
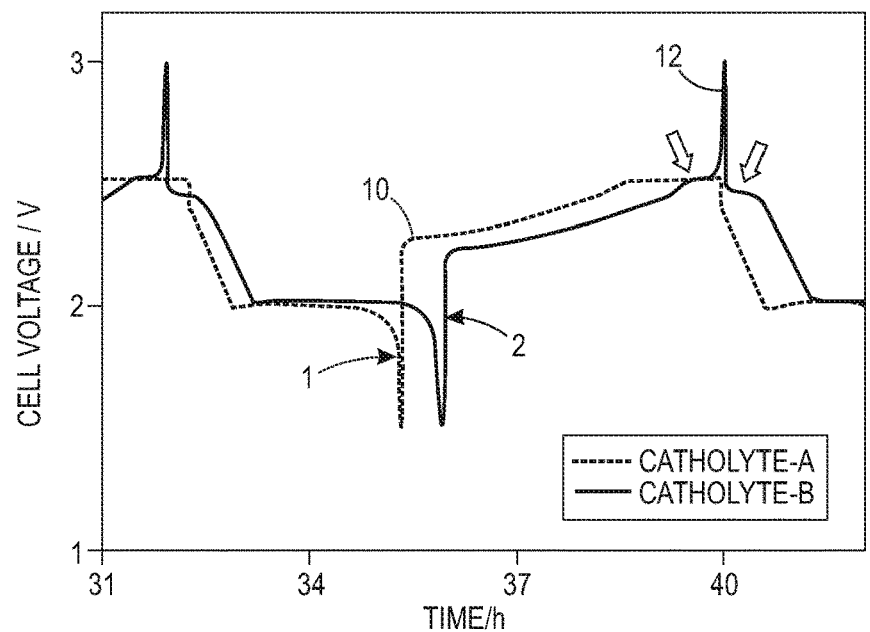
FIGS. 1 and 2 show discharging and charging voltage profiles and the cycling columbic efficiency of Li/Li$_2$S$_9$ cells with and without LiNO$_3$.
Figure 2:
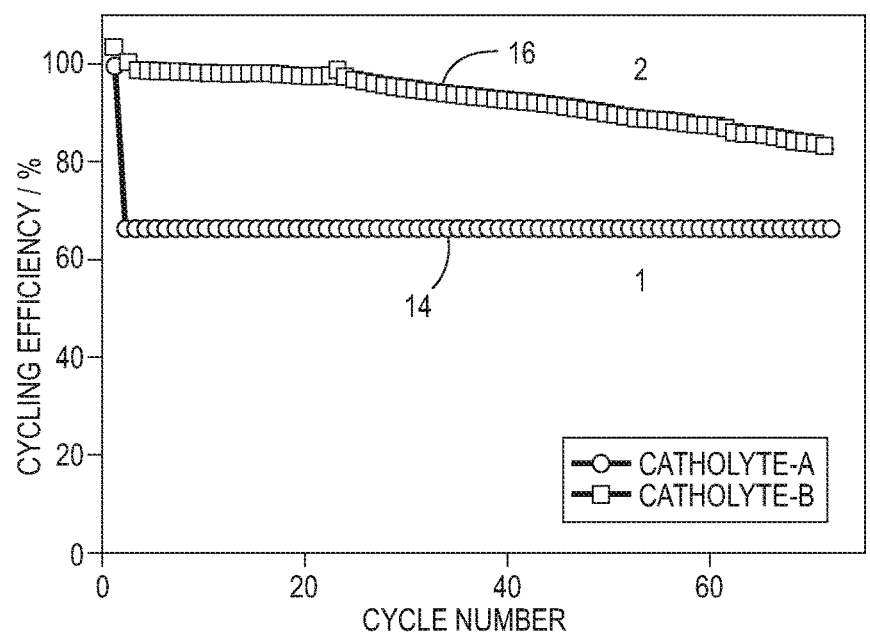

Current techniques to improve the performance of Li—S batteries focus on inhibiting the PS redox shuffle. One approach, set out in "A New Direction for the Performance Improvement of Rechargeable Lithium/Sulfur Batteries," *Journal of Power Sources*, Volume 200, pp. 77-82 (15 Feb. 2012), uses LiNO$_3$ as a co-salt. This inhibits the PS redox shuffle. FIGS. 1 and 2 show discharging and charging voltage profiles and the cycling columbic efficiency of two Li/Li$_2$S$_9$ cells with and without LiNO$_3$.

As can be seen in FIG. 1, the most significant different between two cells, is the Cell 1 cannot be charged about 2.5 V, while Cell 2 with LiNO$_3$ can repeatedly be charged to 3 V. A steep voltage rise to the cutoff voltage (3.0 V) represents oxidation of sulfur from lithium polysulfide (Li$_2$S$_8$), resulting in a rechargeable Li—S battery with good capacity retention and cycling columbic efficiency. In addition, Cell 2 exhibits a pair of additional voltage plateaus at approximately 2.3 V in discharge and charge processes, as indicated by two arrows in FIG. 2. This displays the reversible reaction between lithium polysulfide and sulfur.

The effect of LiNO$_3$ on cycling efficiency is presented in FIG. 2, where Cell 2 shows significantly higher Columbic efficiencies. Adding LiNO$_3$ in to the liquid electrolyte stimulates formation of a stable passivation film or "solid electrolyte interface (SEI)" on the surface of the Li anode. The passivation film formed with LiNO$_3$ not only protect the lithium anode from chemical reaction with the dissolved PS but also prevents PS from electrochemical reduction on the Li anode surface.

Figure 3:
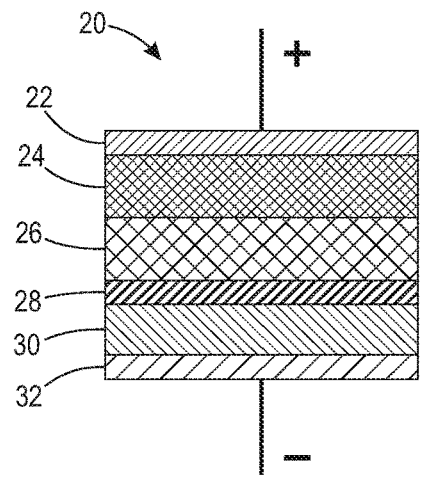
FIG. 3 shows an embodiment of a dual-layer structural sulfur cathode.

Another approach addresses suppression of the diffusion of dissolved PS out of the cathode, a Li—S liquid cell consisting of a dual-layer structural sulfur cathode was introduced as discussed in, "A Proof-of-Concept Lithium/Sulfur Liquid Battery with Exceptionally High Capacity Density," *Journal of Power Sources*, Volume 211, pp. 169-172, (1 Aug. 2012). The dual-layer structural sulfur cathode shown in FIG. 3 consists of stainless steel contacts 22 and 32, having a highly porous carbon cloth 24 as the current collector and a porous sulfur paper 26 as the source of the active material. The separator 28 lies adjacent to the sulfur paper, with a lithium anode 30.

Generally, both elemental sulfur and its reduction products are non-conductive so that the operation of the cell entirely depends on the dissolution of PS. The conductive carbon cloth layer servers as the cathode current collector and provides more reaction sides able to hold more amount of the insoluble reduction products (Li$_2$S$_2$ and Li$_2$S) of the sulfur and polysulfide into the pores in the woven texture, preventing the sulfur shuttle to the Li anode and increasing sulfur utilization. Suppression of the diffusion of dissolved PS out of the cathode is more closely connected to the surface area and pore size than porosity.

Figure 4:
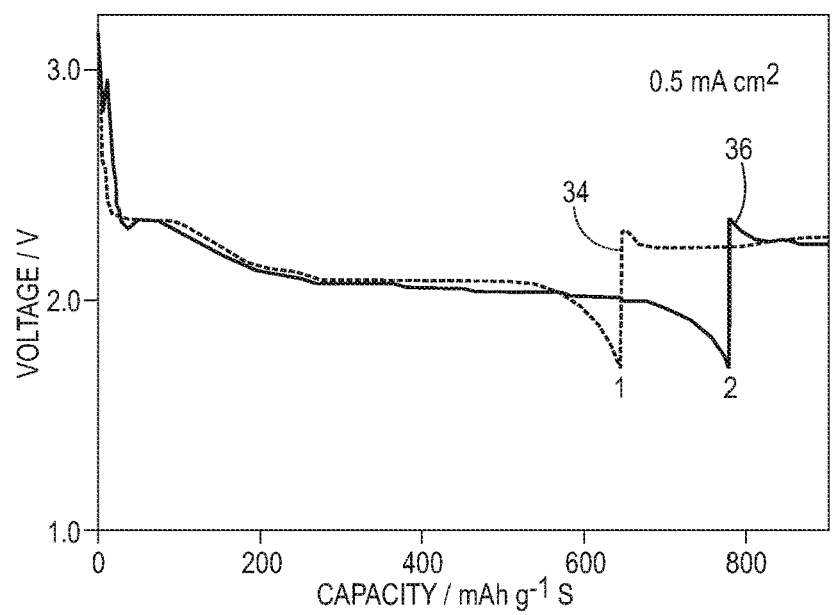
FIG. 4 shows a graph of capacity versus voltage for two different carbon cloths.

FIG. 4 shows the effects of two different carbon cloths on the first discharge of Li—S liquid cells. The line 34 is a carbon cloth having an areal porosity of 20.2 cm$^3$/cm$^2$ and a surface area of 3.67 m$^2$/g. The line 36 is for an activated carbon cloth having an areal porosity of 17.5 cm$^3$/cm$^2$ and a surface area of 871.4 m$^2$/g. The activated carbon cloths performed better than the carbon cloths, indicating that the surface area is more important than area porosity.

Figure 5:
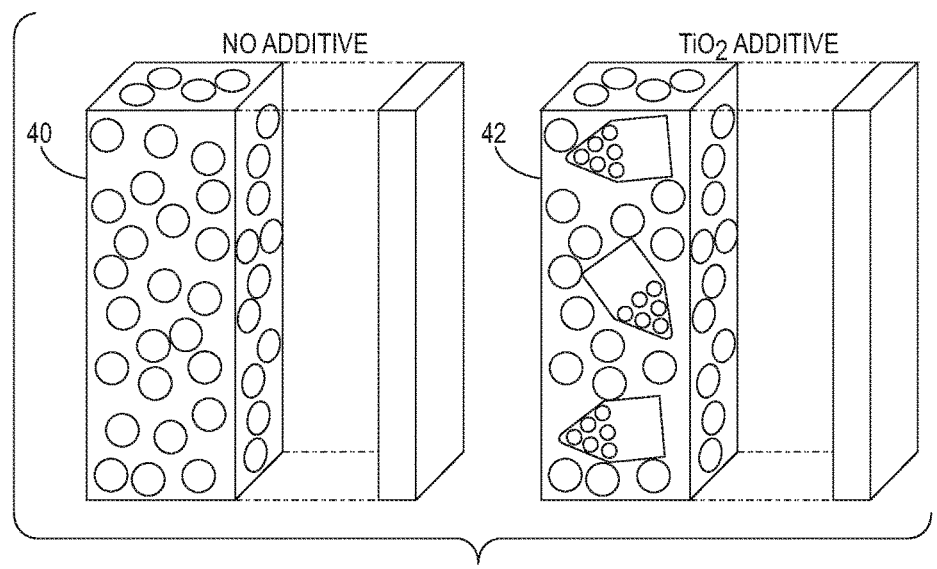
FIG. 5 shows embodiments of cells with and without additives.

Yet another approach is set out in "Understanding the Nature of Absorption/Adsorption in Nanoporous Polysulfide Sorbents for the Li—S Battery, "*Journal of Physical Chemistry C*, Volume 116, Issue 37, pp. 19653-19658, in which porous materials adsorb or absorb dissolved PS improving the long-term cycleability of the Li—S cell. FIG. 5 shows a first cell 40 having no additive. In contrast, the second cell 42 in which mesoporous silica (SiO$_2$) was added into the mesoporous carbon and an elemental sulfur cathode composite in order to sequester the soluble lithium polysulfide at the cathode.

Figure 6:
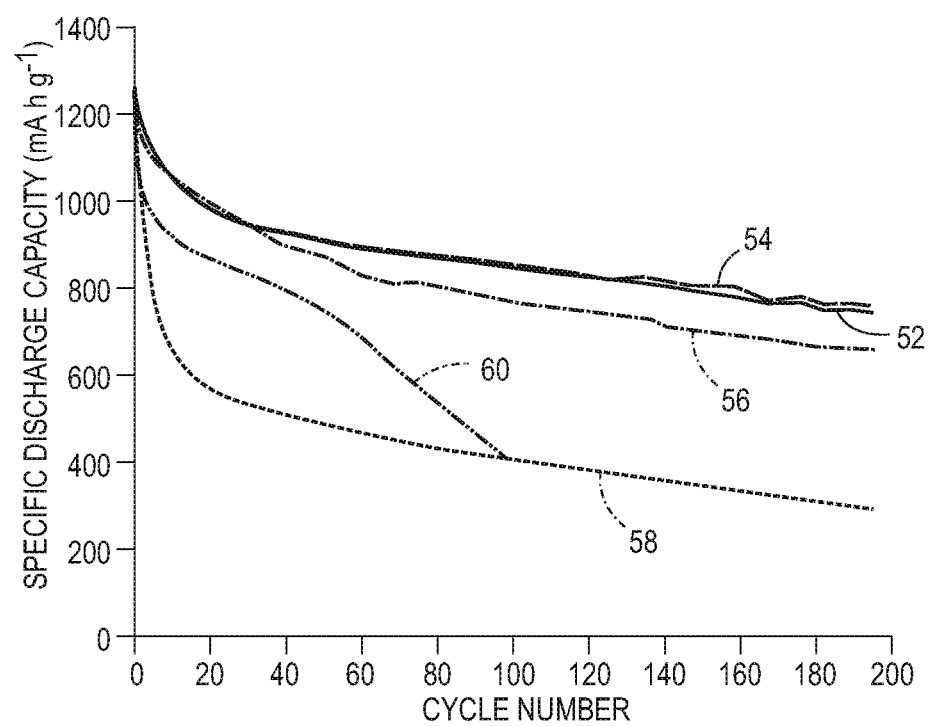
FIG. 6 shows a graph of long-term cycling performance of sulfur cathode electrodes.

FIG. 6 shows the long-term cycling performance of sulfur cathode electrodes, which represents a large performance improvement with the use of a small amount of mesoporous SiO$_2$ when compared to the curve 60. The other curves represent variations on TiO$_2$, such as α-TiO$_2$ as curve 54, β-TiO$_2$ as curve 56, and γ-TiO$_2$ as curve 58. The TiO$_2$ compound increases the electrostatic attraction between the negative polysulfides and the oxide surface as it is more electropositive than $SiO_2$. As can be seen by the curves, $SiO_2$ and $\alpha$-$TiO_2$ have almost identical cycling stability and high initial discharge capacities above 200 mAh/g, with 71% sulfur utilization, even though the surface area and pore volume of $\alpha$-$TiO_2$ are significantly less than those of $SiO_2$. $\alpha$-$TiO_2$ has a specific surface area of 275 $m^2$/g, and a specific pore volume of 0.41 $cm^3$/g, and $SiO_2$ has a specific surface area of 918 $m^2$/g and a specific pore volume of 1.00 $cm^3$/g. With the different $TiO_2$, samples with different surface areas, pore volumes, and pore size distributions, it was concluded that polysulfide species were preferentially absorbed within the pores of the metal oxide, instead of being adsorbed on the surfaces of the particles.

As shown above, it is possible to use carbon cloth or mesoporous metal oxides to adsorb or absorb dissolved polysulfide. This increases the performance of Li—S batteries. This discovery can be applied to batteries formed through a co-extrusion process in which two or more materials are extruded through a print head to result in stripes of different materials lying adjacent to each other on a substrate. Examples of such a print head and the resulting structures may be found in U.S. Pat. Nos. 7,765,949; 7,780,812; and 7,922,471.

Figure 7:
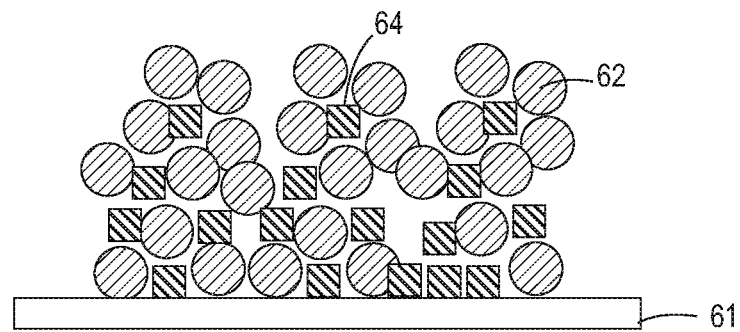
FIG. 7 shows an example of conventional sulfur cathode electrodes.

FIG. 7 shows an example of a conventional sulfur cathode electrode having a mesoporous metal oxide 64 added to the sulfur 62 forming a mixture. In this embodiment, the quality of the metal oxide dispersion limits the performance improvement obtained by the addition. If the metal oxides agglomerate or concentrate near the current collector, the Li—S battery performance will be degraded. The degradation results from large cell polarization owing to its high contact resistance as well as corrosion of the lithium anode due to the diffusion of dissolved PS. Additionally, sulfur cathodes have experienced approximately 80% volumetric increase when elemental sulfur is reduced to insoluble $Li_2S$ during the discharge. The product of the reduction reaction forms on the cathode. This initiates cracks and decreases the specific capacity and the cycling life.

Figure 8:
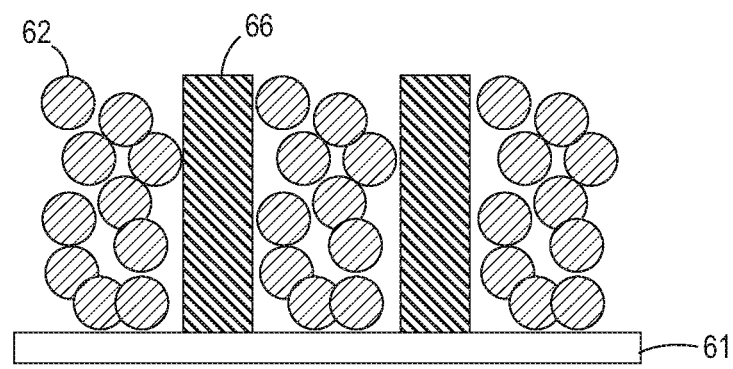
FIGS. 8-10 show embodiments of cells with duplex structures.
Figure 9:
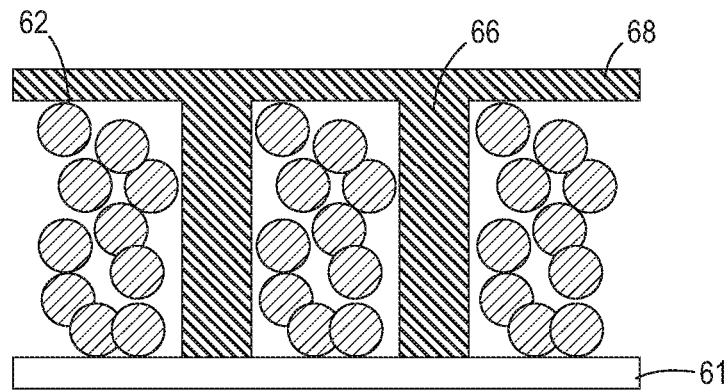
Figure 10:
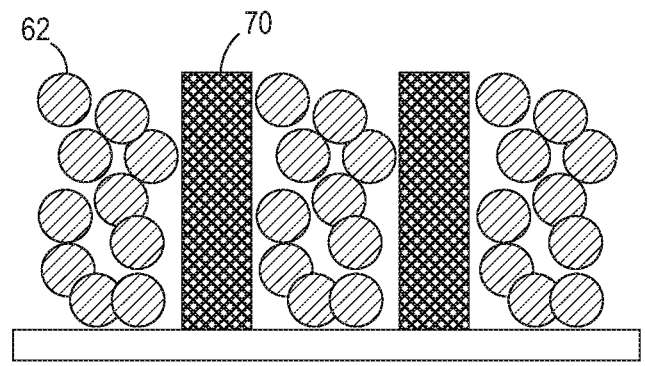

In the embodiments of FIGS. 8-10, the additives are formed as duplex structures, such as with the co-extrusion print head discussed above. The duplex structures have electroactive and non-electroactive regions. These enable higher energy and power density, lower self-discharge, and longer cycle life. In these duplex structures, electroactive regions composed of mesoporous carbon and sulfur will serve as electrically conductive reservoirs of active material, while the non-electroactive region will be more porous and can be constructed from many different materials such as non-electroactive mesoporous metal oxides like silicon oxide, various forms or titanium oxide, etc. or more electronically conductive carbon as shown in FIGS. 8-10. While this region will be referred to as the non-electroactive region in the discussion below, one should note that the region may actually be somewhat conductive, such as carbon, but will be referred to as non-electroactive because it is less active than the sulfur regions.

In FIG. 8, for example, stripes of non-electroactive mesoporous metal oxide based regions such as 66 are interdigitated with stripes of the sulfur-based material such as 62 on substrate 61. In FIG. 9, a second layer 68 of the non-electroactive material that forms the stripes such as 66 resides on the interdigitated layer. The view of FIG. 9 is a side view. From the top view, one would see a solid layer of the non-electroactive region, with the interdigitated stripes underneath. This type of structure may be formed using the same co-extrusion print head type of device, set out for example in US Patent Publication 20140186519. This second layer may consist of the non-electroactive material.

In FIG. 10, the non-electroactive region between the sulfur regions 62 may consist of carbon, such as carbon cloth. One must realize that while the structures shown may consist of duplex structures using two materials, they may consist of duplex structures of more than one material, or the non-electroactive regions may vary. For example, a structure may have a sulfur stripe, a mesoporous metal oxide stripe, a sulfur stripe, a carbon stripe, etc. Alternatively, by controlling the flow of materials into the print head, the non-electroactive materials may change from metal oxides to carbon across the structure. The variations and modifications are not limited by any examples shown here.

The non-electroactive region formed from the mesoporous metal oxide perform many important functions. These functions include trapping the dissolved PS, providing fast lithium ion conduction paths, and accommodating the increase volume during the discharge process. The material other than the sulfur may also consist of carbon.

With regard to the trapping of the dissolved PS, the presence of the PS degrades the electrical conductivity of the electroactive regions. Sequestering the PS in the non-electroactive regions simultaneously prevents irreversible reactions with the lithium anode as well as improves the conductivity over the battery lifetime. The fast lithium ion conduction paths result from the porous structure in the non-electroactive region. The structure reduces the tortuosity of the conduction paths and decreases the concentration polarization in the sulfur electrode. This also results in higher utilization of the sulfur cathode. The high porosity in the electronically conductive carbon region can accommodate large volume changes induced by the reduction products.

In this manner, Li—S batteries having higher specific capacity and lower costs may become viable for manufacturing. The mitigation or elimination of the results of the polysulfide reduction overcomes previous problems with low material utilization and poor rechargeability, as well as mechanical problems such as cracking. The embodiments discussed here provide a device in which these issues are eliminated.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A cathode of a battery having a lithium anode, consisting essentially of:
    a first set of stripes of mesoporous carbon and sulfur-containin materials forming electroactive regions on a substrate in a first layer, wherein each stripe in the first set of stripes comprises a co-extruded material composed of the mesoporous carbon and the sulfur-containing materials; and
    a second set of stripes of mesoporous metal oxide material forming non-electroactive regions interdigitated with the first set of stripes on the substrate in the first layer such that the first and second stripes reside adjacent each other on the substrate, the second set of stripes arranged to capture polysulfide generated by the sulfur-containing materials and to prevent the polysulfide from reaching the lithium anode; and a second layer of the material forming the non-electroactive regions arranged on the first and second sets of stripes opposite the substrate.

2. The electrode of claim 1, further comprising a third set of stripes, wherein the second set of stripes comprises porous metal oxide and the third set of stripes comprises carbon.

3. The electrode of claim 1, wherein the second set of stripes comprises carbon cloth.

4. The electrode of claim 1, wherein the second layer comprises the material forming the non-electro active regions.

5. The electrode of claim 4, wherein the second layer comprises an insulating layer forming a separator for a battery.

* * * * *